United States Patent [19]
Voll

[11] 3,889,247
[45] June 10, 1975

[54] DEVICE FOR DETECTING THE PRESENCE OF LIQUIDS

[76] Inventor: Walter Voll, 8728 Hassfurt, Germany

[22] Filed: Dec. 17, 1973

[21] Appl. No.: 425,656

[30] Foreign Application Priority Data
Dec. 21, 1972   Germany.............................. 2262559

[52] U.S. Cl................ 340/244 C; 73/313; 73/322.5; 340/235; 340/244 R
[51] Int. Cl............................................ G08b 21/00
[58] Field of Search........... 340/244, 261, 383, 388, 340/245, 247

[56] References Cited
UNITED STATES PATENTS

| | | | |
|---|---|---|---|
| 1,443,357 | 1/1923 | Gardner........................ | 340/247 UX |
| 3,432,843 | 3/1969 | Spring................................. | 340/283 |
| 3,530,463 | 9/1970 | Spadini et al................... | 340/388 X |
| 3,636,544 | 1/1972 | Codina................................. | 340/261 |
| 3,732,556 | 5/1973 | Caprillo et al.............. | 340/244 C X |
| 3,781,840 | 12/1973 | Roberts et al...................... | 340/245 |

FOREIGN PATENTS OR APPLICATIONS

| | | | |
|---|---|---|---|
| 1,609,195 | 12/1969 | Germany............................ | 340/245 |

Primary Examiner—John W. Caldwell
Assistant Examiner—Daniel Myer
Attorney, Agent, or Firm—Sughrue, Rothwell, Mion, Zinn and Macpeak

[57] ABSTRACT

A device for detecting the presence of liquid such as flood water, and for providing an audible alarm signal when such liquid is present. The device comprises a housing — which is preferably of generally spherical shape and capable of floating in a stable upright position. In the housing is provided an electro-acoustic transducer provided with a metal diaphragm. At least two mutually spaced electrodes are supported on an exterior surface portion of the housing to be exposed to contact by liquid to be detected. The device is provided with electrical circuit means including the electrodes and responsive to a change in impedence therebetween to generate a signal condition. The device also includes electrical generator means located in the housing and electrically connected to the circuit means to generate an electrical signal to operate the transducer in response to the signal condition generated when either electrically conductive or electrically non-conductive liquid contacts the electrodes.

9 Claims, 5 Drawing Figures

DEVICE FOR DETECTING THE PRESENCE OF LIQUIDS

BACKGROUND OF THE INVENTION

The present invention relates to a detector device for detecting the presence of liquid.

Such a device finds application in a wide variety of different situations, for example, it may be used to detect water leaking into cellar rooms, into bathrooms or into kitchens. The device is capable of application where it is important to detect the presence of liquid and to provide an acoustic signal to indicate that such liquid has been detected.

Furthermore, the device is also usable as a rain alarm. The device can be applied, for example, to provide a warning of the leakage of heating oil in defective tank installations. The device is also capable of being used in conjunction with a container to provide a signal when liquid in the container reaches a predetermined level.

SUMMARY OF THE INVENTION

According to the present invention, there is provided a detector device for detecting the presence of liquids, the device comprising a housing, electro-acoustic transducer means supported in the housing, at least two mutually spaced electrodes supported on an exterior surface portion of the housing to be exposed to contact by liquid to be detected, electrical circuit means including the electrodes and responsive to a change in impedance therebetween to generate a signal condition, electrical generator means in the housing and electrically connected to the circuit means to generate an electrical signal to operate the transducer in response to the signal condition, the arrangement being such that the transducer provides an audible indication of the presence of such liquid at the electrodes.

BRIEF DESCRIPTION OF THE DRAWINGS

Embodiments of the invention will now be more particularly described with reference to the accompanying drawings, in which.

DESCRIPTION OF THE PREFERRED EMBODIMENTS

Figure 1:
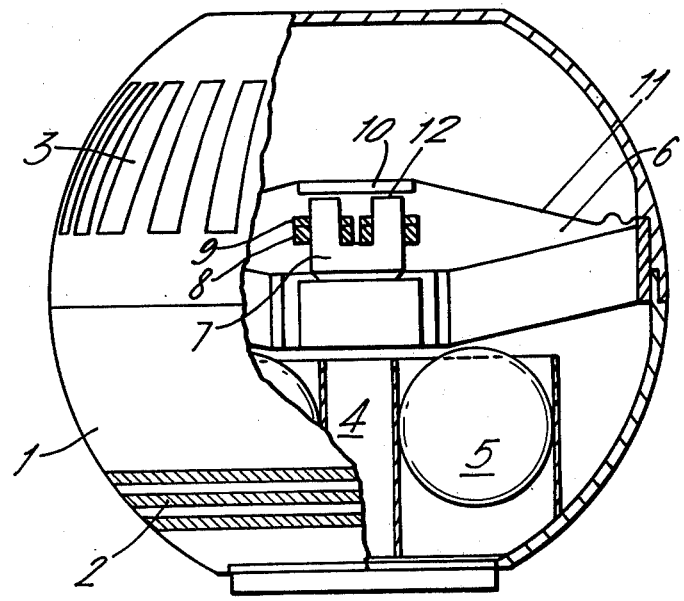
FIG. 1 shows an elevational view of a device for detecting liquid incorporating a hollow generally spherically shaped housing.
Figure 5:
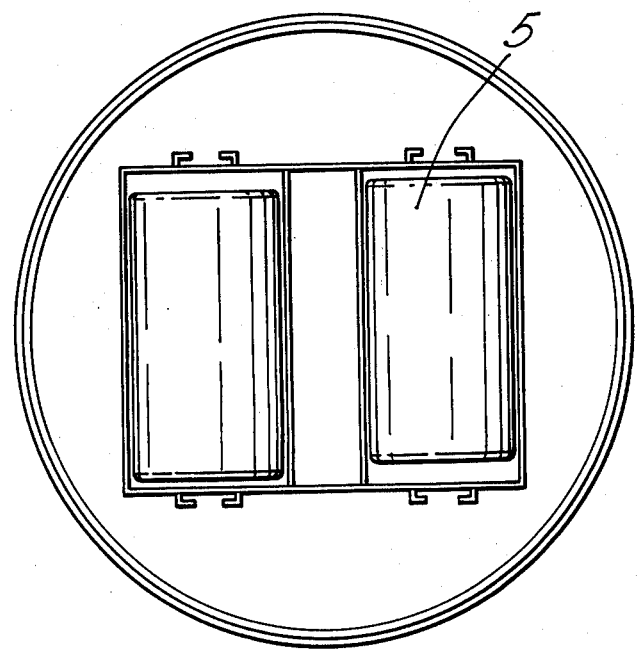
FIG. 5 shows a plan view of the device shown in FIG. 1, with the upper part of the housing and some of the components omitted in the interest of clarity of illustration.

FIGS. 1 and 5 show two views of the device. In FIG. 1, the device is shown in elevation and, in FIG. 5, the device is shown in plan – with an upper part of the housing and some of the components shown in FIG. 1 removed. As shown in FIG. 1, the device comprises a generally spherical housing 1, on an outer surface portion of which there are provided a plurality of electrodes 2. As shown in FIG. 1, the housing 1 is provided with a flat base portion to enable the device to be supported on a horizontal surface and with a flattened top portion to enable the device to be inverted and then supported on a flat surface. The housing 1 comprises two mutually interconnected and substantially hemispherical parts, which may be disconnected from one another to provide access to the interior of the housing. The upper portion of the housing shown in FIG. 1 is provided with a plurality of openings 3, through which air may pass. In the interior of the housing 1 an electro-acoustic transducer 6 provided with a metallic diaphragm 11 is disposed. The electrodes 2 are mutually spaced apart from one another and are electrically connected to electrical circuit means in the housing 1. The electrical circuit means, as will subsequently be described in greater detail, is responsive to changes in impedence between the spaced electrodes 2 to generate a signal condition. In FIG. 1, the block indicated by the reference 4 represents schematically electrical signal generator means disposed in the housing and electrically connected to the electrical circuit means including the electrodes 2 to generate an electrical signal. This signal is utilized to operate the electro-acoustic transducer 6 in response to changes in impedence which occur between the electrodes 2 when the latter are in contact with a liquid. Thus, the electro-acoustic transducer 6 provides an audible alarm signal when liquid contacts the electrodes 2. The electro-acoustic transducer 6 comprises a core of magnetisable material 7 and a movable magnetisable member 10, which is rigidly connected to the metallic diaphragm 11, and which is supported in the vicinity of the ends of the U-shaped core of magnetisable material 7 so as to define an air gap 12 between the movable magnetisable member 10 and the core 7. The magnetisable core 7 is provided with a first winding 8, which is connected to output means of the electrical generator means represented schematically by the block 4 in FIG. 1. The core 7 is also provided with a feedback winding 9, which is connected to input means of the electrical generator means 4. The electrical generator means 4 and the associated electrical circuit means including the electrodes 2 are connected to electrical storage batteries 5. As indicated in FIG. 1, the electrical storage batteries 5 are so disposed in a lower portion of the casing 1 of the device that the centre of gravity of the device is disposed below its centre of buoyancy when the device is floated in a liquid. FIG. 5 shows the disposition of the storage batteries 5 relative to the lower half of the casing 1, as viewed in plan with the upper half of the casing 1 removed. The device is arranged to float in a liquid in a condition of stable equilibrium, in which the openings 3 are disposed above the level of the liquid in which the device is floated. Thus, even when the device is situated in proximity to a pipe burst or a large quantity of flood water, the device does not become immersed in the flood and therefore may continue to provide an audible warning for a long period. The duration of this period depends, of course, on the capacity of the batteries 5 used to provide electrical power to operate the device, and on the quantity of electrical power consumed by the device when in its operative state. In one embodiment, the capacity of the storage batteries is such that the device may continue to provide an audible warning for as long as ten hours after the warning was initiated.

As shown in FIG. 1, the housing 1 of the device resembles a hollow oblate spheroid and the provision of flattened surfaces at the poles of the housing enables the device to be supported on a horizontal surface either in the position shown in FIG. 1 or in an inverted position, in which the flattened top in FIG. 1 of the housing 1 rests on a support and the electrodes 2 are disposed around an upper part of the housing. In the latter position, the device may be used to detect the presence of rain falling on the electrodes 2. The rain water causes an electrically conductive path to be established between the mutually spaced electrodes 2 and, in a manner which will be described subsequently in greater detail, the establishment of such an electrically conductive path causes the electrical circuit means in which the electrodes 2 are connected to generate a signal condition. The electrical generator means, indicated generally in FIG. 1 by the block 4, is responsive to this condition to generate an electrical signal which operates the electro-acoustic transducer 6 and provides an audible warning in the event of rain water falling on the electrodes 2.

As shown in FIG. 1, the electrodes 2 are disposed in concentric circules around the outer surface of the lower portion of the generally spherical casing 1. The individual electrodes 2 may consist of metal foils or of conductive lacquer and may either be deposited on the outer surface of the housing 1, or may be inlaid in an outer surface portion of the housing 1. As described above, it is necessary for the liquid to be detected to establish an electrically conductive power between mutually spaced electrodes 2. In the case of rain water, this path is established by rain falling directly on to that part of the outer housing 1 on which the electrodes 2 are disposed, since rain in falling through the atmosphere will already have assimilated sufficient trace elements of acid and impurities present in the atmosphere to render the rain water conductive. The sensitivity of the device to raindrops may be increased by providing a plurality of mutually spaced ring electrodes 2.

The device is also capable of detecting electrically non-conducting liquids, for example heating oil. The presence of such electrically non-conductive liquids between the mutually spaced electrodes 2 causes capacitive changes to occur between the electrodes. As will be described subsequently in greater detail, the electrical circuit means in which the electrodes 2 are connected is responsive to such changes in capacity to generate the signal condition causing the electrical generator means to generate an electrical signal to operate the transducer 6.

So that water possibly penetrating through the sound outlet openings 3 does not destroy the diaphragm 11, this is constructed of metal.

Buzzers of conventional kind are not suitable due to their inadequate efficiency, since it may be necessary for the device, after being triggered, to continue to provide an alarm signal for at least 10 hours before the capacity of the batteries 5 is exhausted.

Since the device, because of its floatability, must have the smallest possible weight, it was necessary to develop a sound generator with high efficiency and high operational security. Sinusoidal or rectilinear voltages suitable to operate the electro-acoustic transducer 6, which are applied to the winding 8, are generated by electronic circuit means energised from a source of unidirectional voltage.

Figure 2:
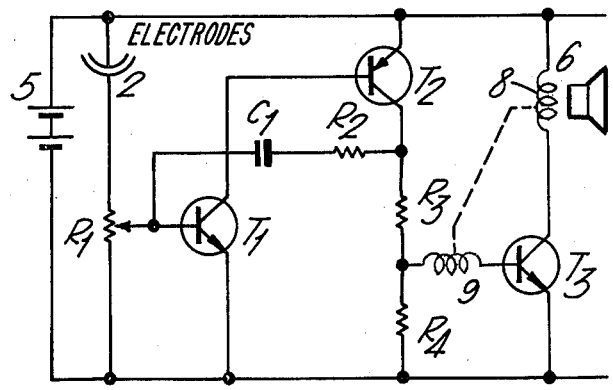
FIG. 2 shows an electrical circuit diagram of the device in accordance with one embodiment of the invention.

Two examples of circuits for the electronic block 4 will now be described as follows:

FIG. 2 shows a circuit arrangement responsive to the presence of electrically conductive liquid in contact with the electrodes 2. Referring now to FIG. 2, a transistor T3 together with resistors R3, R4 and the output winding 8 and the feed-back winding 9 form a blocking oscillator, which generates an electrical output signal to operate the transducer 6. When the supply battery 5 is disconnected, which is the case when the transistor T2 is in a non-conductive state, then the electrical output signal ceases. Conversely, when the electrodes 2 are bridged over by conductive liquid, a small control current flows through a resistor R1 and a transistor T1 (R1 may have a value of 2 Megohms), the transistor T2 is rendered conductive and an audible alarm signal is produced by the transducer 6.

The value of a resistor R1, which is connected in series with the spaced electrodes 2, is so chosen that the control current is not quite sufficient to render the transistor T2 conductive.

As soon as a control current flows through the electrodes 2 and thus also through the resistors R3 and R4, a feed-back current flows simultaneously through the resistor R2 and the capacitor C1 to the base of the transistor T1. This has as a consequence, that the transistor T2 is rendered conductive. After charging-up of the capacitor C1, the transistors T1 and T2 are rendered non-conductive. This process repeats itself in a certain rhythm (for example one second pause, 1 second pulse). The transistors T1 and T2 are of mutually complementary types and, together with the resistors R1, R2, R3 and R4 and the capacitor C1, form a pulse generator. Thus by the addition of a single capacitor C1 and a resistor R2, an interrupted alarm signal (rising and falling) is obtained. It has been found that such an alarm signal attracts attention more readily than a continuous signal.

A further advantage is given thereby, that with a duty cycle of for example 1:1, the discharge time of the current source 5 employed is doubled, since no current consumption occurs during the readiness for alarm, since all transistors are blocked. This means, that the life of the current source 5 is limited largely by its shelf life (about 1 – 3 years).

Figure 3:
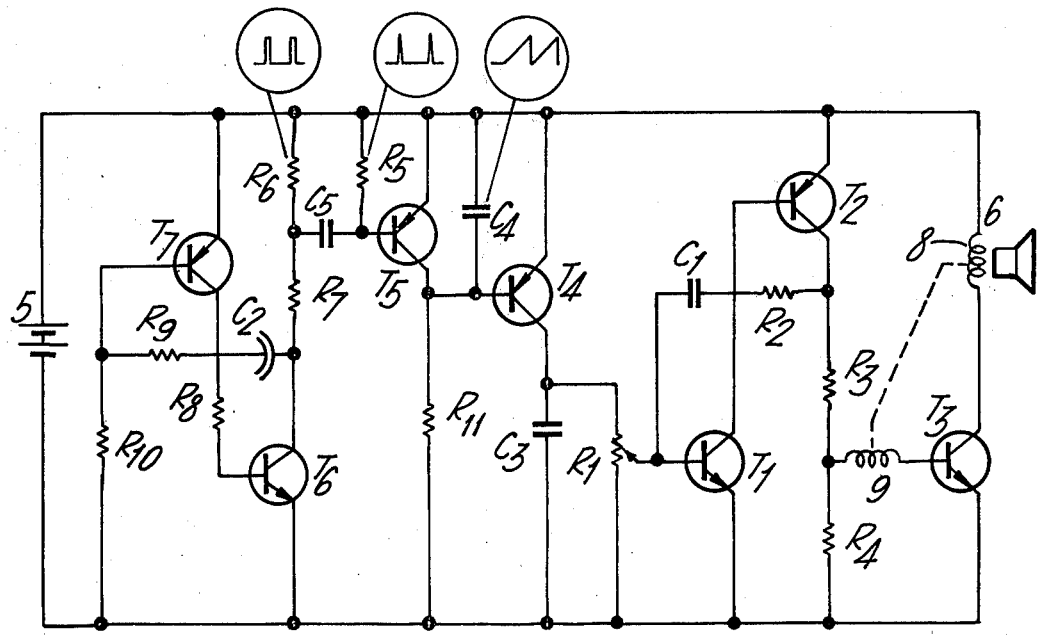
FIG. 3 shows an electrical circuit diagram of the device in accordance with another embodiment of the invention.
Figure 4:
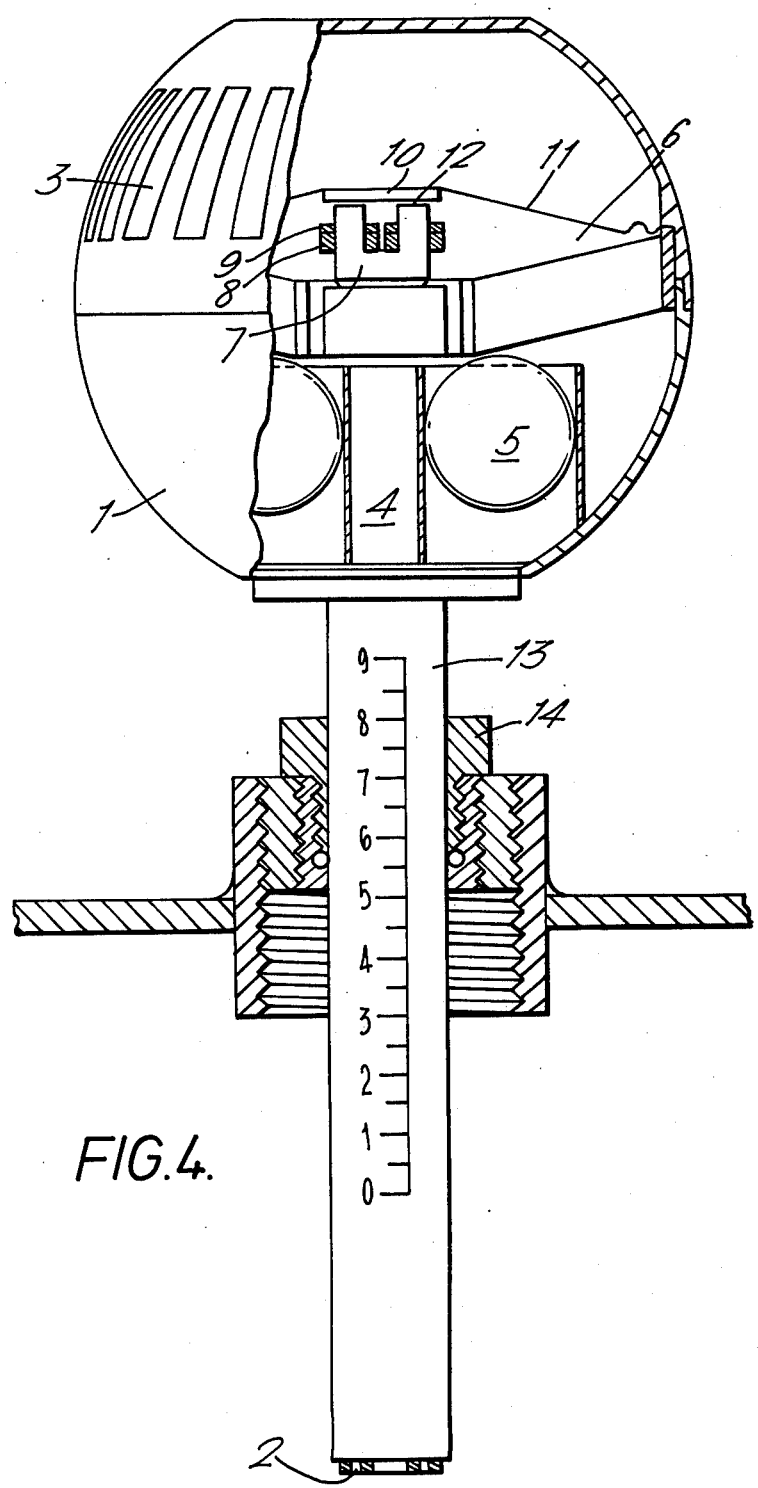
FIG. 4 shows the device adapted to monitor the level of liquid in a container.

FIG. 3 shows a circuit arrangement responsive to the presence of electrically non-conductive liquid between the spaced electrodes, which are designated in FIGS. 1, 2 and 4 by reference numeral 2 and which are represented in FIG. 3 by the capacitor C2. Referring now to FIG. 3, the transistors T1, T2 and T3, the resistors R1, R2, R3 and R4, the capacitor C1 and the electro-acoustic transducer 6 including the winding 8 and the feed-back winding 9 correspond to the similarly referenced components in FIG. 2. However, in FIG. 3 a transistor T4 is so connected that, when the transistor T4 is non-conductive, no alarm signal is provided. On the transistor T4 being rendered conductive, an audible alarm signal is provided by the transducer 6.

As explained above, in FIG. 3, the capacitance between the spaced electrodes is represented by a small capacitance C2, on the increase of which by a certain amount, the transistor T4 is rendered conductive to trigger the alarm signal. Capacitive transmitters normally operate in such a manner, that an alternating voltage is generated electronically and applied to a balanced bridge, in which the variable capacitance is connected in one of the arms. If the capacitance (in the present case, this would be capacity between the spaced electrodes 2 of FIGS. 1 and 4), is then varied, the bridge gets out of balance and a signal is derived from the bridge and applied to an evaluating circuit.

This principle is not possible in the present case of application, since the constant current consumption would quickly exhaust the current source 5 and the device would thus fail in its purpose. The need to overcome this problem has led to the development of the circuit arrangement shown in FIG. 3.

Transistors T7 and T6 of mutually complementary type, the resistors R9, R8, R7 and R6, and capacitor C2 represent a pulse generator similar to that which has already been described in FIG. 2. The feed-back capacitor C2 in FIG. 3 corresponds to the capacitor defined by the mutually spaced electrodes 2 of FIGS. 1 and 4. It is presupposed, that the described kind of pulse generators generate rectangular pulses, both the transistors T6 and T7 being non-conductive during intervals between generated pulses. Thus, no electrical current flows during the inter-pulse pause. Such a pulse generator may have a duty cycle ratio of the order of 1:10,000 and thus an average current consumption of only a few micro-amps is required. The duration of the pulse pause depends on the resistor R10 and the capacitor C2. With a fixed resistor R10, the pulse repetition frequency also has a fixed value. If the electrodes 2 are now wetted with oil, then the capacitance of C2 increases and the pulse repetition rate becomes slower.

If the capacitor C4 is charged through a resistor R4 and is discharged at a particular pulse repetition frequency, then a saw-tooth voltage is generated at the capacitor C4. The previously described pulses, generated by the pulse generator including the transistors T6 and T7, are applied through the capacitor C5 to the transistor T5, which controls the periodical discharge of the capacitor C4.

The greater the pause between two discharging pulses, the greater becomes the maximum amplitude of the saw-tooth voltage developed across the capacitor C4. The circuit arrangement is so arranged that — with non-wetted electrodes 2 (see FIGS. 1 and 4) - the peak of the saw-tooth voltage amounts to about 0.5 volts, which is insufficient to render the transistor T4 conductive.

If the electrodes 2 (see FIGS. 1 and 4) are now wetted with oil or other suitable nonconductive liquid, the capacitance of the capacitor C2 becomes greater, the pulse repetition frequency slower, the maximum amplitude of the saw-tooth voltage greater and the transistor T4 is rendered conductive and triggers the transducer 6 to produce an audible alarm signal.

The rectangular pulses at the resistor R6 in FIG. 3 are differentiated by the capacitance of the capacitor C5, that is to say, that should the electrodes 2 (C2) be bridged over for any reason, then the device is not inoperative, but the constant signal now occurring at the resistor R6 is not transmitted to the transistor T3 and a warning tone is triggered.

With appropriate choice of values for the resistors R6 and R7, the circuit can be so arranged, that the pulses obtained with a fresh battery 5 are transmitted through the transistors T5 but, with reduced battery voltage due to the batteries approaching the end of their useful life span, the pulses obtained are no longer transmitted through the transistor T5 and a warning signal is provided. In this manner a warning signal, which indicates that the batteries 5 must be renewed, is generated.

During the readiness for alarm, current flows only through the resistors R10 and R11. These resistors lie in the Megohm-range and load the batteries to a lesser extent than they are loaded by their self-discharge, whereby a life of 1 to 3 years for the batteries 5 may reasonably be anticipated.

FIG. 4 shows the device adapted to monitor the level of liquid in a container. As shown in FIG. 4, the housing comprises an elongate tubular member 13 having an end portion adapted to project into the interior of a container. The tubular member 13 passes through a sealing bush 14 provided in the wall of the container. The extent to which the tubular member 13 projects into the container is indicated by a calibrated scale thereon. As shown in FIG. 4, two mutually spaced electrodes 2 are provided on the end face of the lower end of the tubular member 13. These electrodes 2 are electrically connected by conductors — which are not shown in FIG. 4 but which may extend along the interior of the tubular member 13 — to electrical generator means 4 in the housing 1. The electrical generator means 4 may either be of the kind which has been described with reference to FIG. 2 or of the kind which has been described with reference to FIG. 3. The remaining components of the device shown in FIG. 4 correspond to the similarly referenced components shown in FIG. 1. The level at which the electrodes 2 are located may be determined by reference to the scale calibrations provided on the tubular member 13. Thus, when the level of liquid in the container rises to such an extent that it contacts the electrodes 2, a change in the impedance provided by the path between the spaced electrodes occurs. The electrical circuit means including the electrodes generates a signal condition to which the generator 4 is so responsive as to actuate the electroacoustic transducer 6. Thus, the device shown in FIG. 4 may be used to provide an audible warning when the liquid in the container reaches a predetermined level.

In addition to providing an audible alarm signal via its electro-acoustic transducer 6, the device may also provide visual warning, for example, by illuminating a warning lamp when liquid is in contact with the electrodes 2 of the device.

I claim:

1. A detector device for detecting the presence of liquids, the device comprising in combination:
   a housing;
   electro-acoustic transducer means supported in said housing;
   at least two mutually spaced electrodes supported on an exterior surface portion of said housing to be exposed to contact by liquid to be detected;
   electrical circuit means including said electrodes and responsive to a change in impedance therebetween to generate a signal condition;
   electrical generator means in said housing and electrically connected to said circuit means to generate an electrical signal to operate said transducer in response to said signal condition, said generator means comprising a first pulse generator connected to said electrical circuit means, a second pulse generator, and a blocking oscillator having input means connected to output means of said second pulse generator, said first pulse generator generating a train of pulses of which the pulse repetition frequency is responsive to said signal condition, said pulse train being applied to input means of said second pulse generator to cause the latter to generate an electrical pulse to trigger said blocking oscillator and thereby to provide said electrical signal to operate said transducer when and only when said pulse repetition frequency is less than a predetermined value; whereby said transducer provides an audible indication of the presence of such liquid at said electrodes.

2. A device as defined in claim 1, wherein said transducer means comprises a core of magnetisable material, a movable member of magnetisable material mounted in close proximity to said core to define an air gap between said core and said movable member, a sheet metal diaphragm rigidly connected to said movable member and flexibly connected to said housing, a first electrical winding disposed on said core and connected to output means of said generator means, and a second electrical winding disposed on said core and connected to input means of said generator means to provide an electrical feedback signal.

3. A device as defined in claim 1, wherein said first pulse generator comprises two transistors of mutually complementary type.

4. A device as defined in claim 1, wherein said second pulse generator comprises two transistors of mutually complementary type.

5. A device as defined in claim 1, wherein said housing comprises a hollow oblate spheroid.

6. A device as defined in claim 1, wherein said device is adapted to float in said liquid, and wherein the center of gravity of said device is located below the center of buoyancy of said device when the latter is afloat, whereby the device is capable of being maintained in a stable upright position when floating in said liquid.

7. A device as defined in claim 1, wherein each said electrode comprises a strip of electrically conductive material disposed on said outer surface of said housing.

8. A device as defined in claim 1, wherein each said electrode comprises a strip of electrically conductive material inlaid in an outer surface portion of said housing.

9. A device as defined in claim 1, wherein said housing comprises an elongate member having an end portion adapted to project into the interior of a container for said liquid, said electrodes being provided on said end portion of said elongate member and being electrically connected to said electrical circuit means, whereby said device is responsive to said liquid in said container being raised to such a level that said liquid contacts said electrodes to provide said audible indication.

* * * * *